A. Morse.
Steering.
Nº 494.    Patented Dec. 1, 1837.
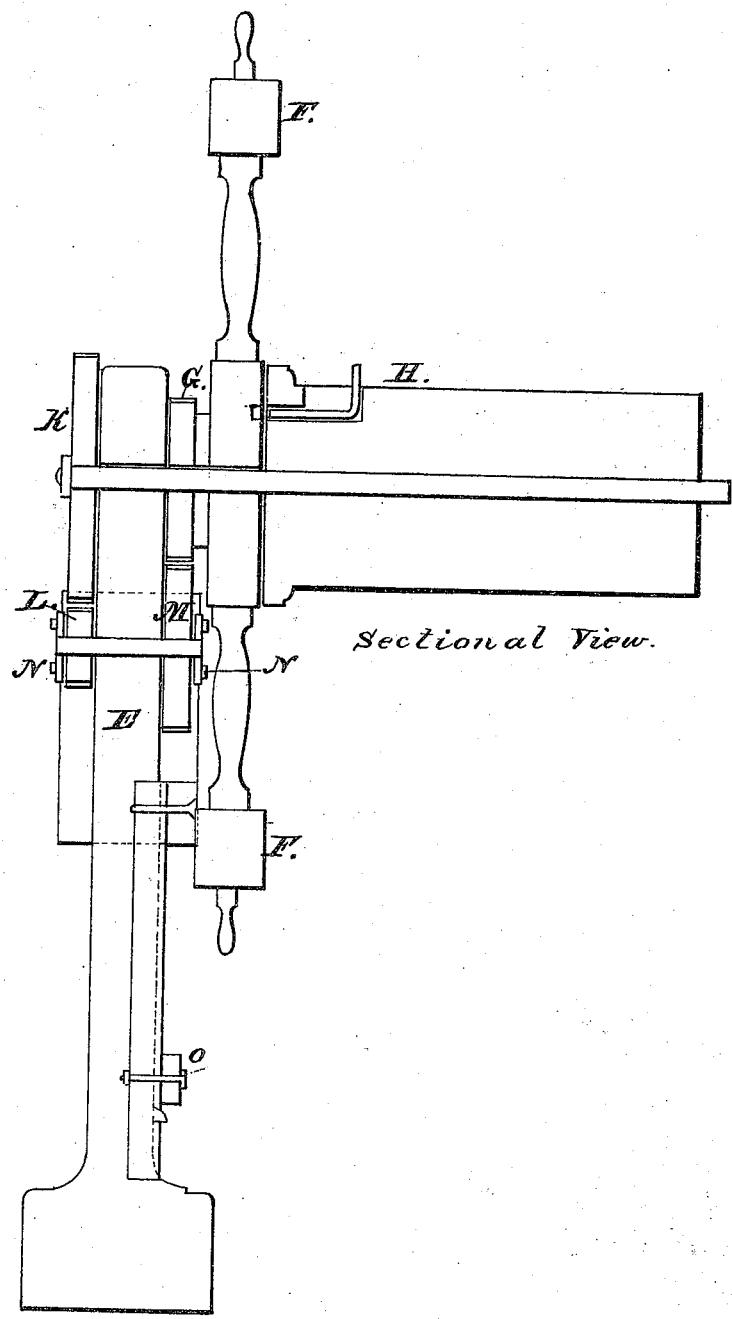
Sectional View.

UNITED STATES PATENT OFFICE.

ANDREW MORSE, JR., OF BOSTON, MASSACHUSETTS.

STEERING WHEEL FOR SHIPS, STEAMBOATS, AND OTHER VESSELS.

Specification of Letters Patent No. 494, dated December 1, 1837.

*To all whom it may concern:*

Be it known that I, ANDREW MORSE, Jr., of Boston, in the county of Suffolk and Commonwealth of Massachusetts, have made an improvement in the useful arts, being an Improved Steering Wheel for Ships, Steamboats, and other Vessels, which is described as follows, and consists of the following parts, as represented in the annexed drawing, which forms a part of this specification, viz:

1, the frame A, B, C, D; 2, the barrel H, with the spurwheel K, attached to the end of its axle; 3, the wheel F, with its spokes, having the spur-wheel G, attached to it; 4, the movable frame N, N, with the wheels L, M, and the lever O.

The frame A, B, C, D, and the barrel H, answer to corresponding parts of the steering-wheel now in use. The frame consists of the necessary floor pieces, with two upright posts E, E, made of sufficient size and strength to support the barrel and other parts of the machinery.

The spur-wheel K, is attached to the end of the shaft, which forms the axle of the barrel H, both the wheel and barrel being confined to and revolving with the axle, the pivots of which axle are supported by the posts E, E.

The wheel F, is similar in its general construction to the one in ordinary use, being furnished with a stout felloe and spokes that extend sufficiently beyond the circumference of the felloe to form handles for working it. This wheel having the spur-wheel G, attached to that part of its surface opposite to the end of the barrel is made to revolve freely around the axle to which the barrel is confined, or it may at pleasure be fastened to the barrel by means of the bolt I, the part of the wheel adjoining the barrel being furnished with sockets for the reception of the bolt. This connection, however, between the wheel and barrel may be effected in any other manner which shall be found more convenient in practice, than the one above described.

The frame N, N, is applied to the post E, directly under the wheels K, and G, having two cross-pieces for supporting the axle or shaft which extends from one cross-piece to the other, through an oblong hole in the post. This shaft is furnished with the spur-wheel M, at one end, directly below the wheel G, and the pinion-wheel L, at the other end directly under the wheel K, which wheels work into each other when thrown into gear as hereinafter described. This frame with its two wheels and axle can be moved up and down on the post by means of the lever O, the perpendicular arm of which lever extends upward on the inner side of the post and is attached to the said frame N, N, at the top; and when the horizontal arm is pressed downward so as to bring the wheels aforesaid into gear, it may be confined in that position by means of a catch or button on the inner side of the post.

The operation of this instrument is such that when the frame N, N, is moved upward by means of the lever O, the wheels L, M, are thrown into gear with the wheels K, G, and, in this position, if the bolt I be withdrawn from its socket in the wheel, the manual force exerted at the periphery of the steering wheel will be communicated through the train of wheels to the barrel H, causing it to turn with an increase of power dependent in degree upon the proportion of the wheels. Or, by lowering the frame N, N, so as to throw the said wheels out of gear, and confining the wheel F to the barrel, the instrument may be worked as a simple steering-wheel, like that in ordinary use. And I produce the same effect by applying at pleasure any of the other known or common arrangements of toothed wheels or wheels and pinions of varying diameter by which power is increased or relinquished by changing the series of wheels through which the power is communicated, by means of clutches, or other common contrivances for connecting alternate wheels or altering their gearing; claiming the right of applying to, and combining with, the steering wheel of ships and other vessels, any and all such known and common mechanism of toothed wheels and pinions with clutches or other fastenings, by which a greater or less effect may be alternately and instantly given to the power applied to the wheel, as light or strong winds may require.

Now, I do not claim as my invention, any of the separate parts of the machinery above described, but I confine my claim to—

The combination with the steering wheel, of series of toothed wheels of varying diameter arranged and brought into gear as described in the foregoing description, or in any other of the known or common methods by which a change may be easily and instantly produced in the effective power by a change of gearing; so that the man at the wheel can at pleasure give to it a greater or less power over the tiller as light or strong winds may render necessary or desirable.

In testimony whereof I the said ANDREW MORSE, Jr., hereunto subscribe my name in presence of the witnesses whose names are hereto subscribed, on the ninth day of September A. D. 1837.

ANDREW MORSE, JR.

Witnesses:
 W. P. WAGG,
 EBEN ALLEN.